(12) United States Patent
Peters

(10) Patent No.: US 7,010,486 B2
(45) Date of Patent: Mar. 7, 2006

(54) SPEECH RECOGNITION SYSTEM, TRAINING ARRANGEMENT AND METHOD OF CALCULATING ITERATION VALUES FOR FREE PARAMETERS OF A MAXIMUM-ENTROPY SPEECH MODEL

(75) Inventor: Jochen Peters, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 706 days.

(21) Appl. No.: 10/075,865

(22) Filed: Feb. 13, 2002

(65) Prior Publication Data

US 2002/0156628 A1 Oct. 24, 2002

(30) Foreign Application Priority Data

Feb. 13, 2001 (DE) .............................. 101 06 581

(51) Int. Cl.
*G10L 15/28* (2006.01)
*G10L 15/08* (2006.01)
*G10L 15/12* (2006.01)
*G10L 15/00* (2006.01)

(52) U.S. Cl. ..................... 704/255; 704/236; 704/231
(58) Field of Classification Search ................ 704/255
See application file for complete search history.

(56) References Cited

U.S. PATENT DOCUMENTS 6,304,841 B1 * 10/2001 Berger et al. ................... 704/2

OTHER PUBLICATIONS

Adam Berger, The Improved Iterative Scalling Algorithm: A Gentle Introduction, Dec., 1997, http://citeseer.nj.nec.com/31826.html.*

Chen, S., Rosenfeld, Ronald. "Efficient Sampling and Feature Selection in Whole Sentence Maximum Entropy Language Models", Acoustics, Speech and Signal Processing, ICASSP-99, IEEE Conference on, vol. 1, Mar. 15-19, 1999, pp. 549-552.*

Beyerlein, Peter. "Discrimitive Model Combination", Automatic Speech Recognition and Understanding, IEEE Workshop on, Dec. 14-17, 1997, pp. 238-245.*

Simons, M., Ney, H., Martin, S.C. "Distant Bigram Language Modeling Using Maximum Entropy", Acoustics, Speech and Signal Processing, ICASSP-97, IEEE Conference on, vol. 2, Apr. 21-24, pp. 787-790.*

(Continued)

*Primary Examiner*—W. R. Young
*Assistant Examiner*—Matthew J Sked

(57) ABSTRACT

The invention relates to a speech recognition system and a method of calculating iteration values for free parameters $\lambda_\alpha^{ortho(n)}$ of a maximum-entropy speech model MESM with the aid of the generalized-iterative scaling training algorithm in a computer-supported speech recognition system in accordance with the formula $\lambda_\alpha^{ortho(n+1)} = G(\lambda_\alpha^{ortho(n)}, m_\alpha^{ortho}, \ldots )$, where n is an iteration parameter, G a mathematical function, $\alpha$ an attribute in the MESM and $m_\alpha^{ortho}$ a desired orthogonalized boundary value in the MESM for the attribute $\alpha$. It is an object of the invention to further develop the system and method so that they make a fast computation of the free parameters $\lambda$ possible without a change of the original training object. According to the invention this object is achieved in that the desired orthogonalized boundary value $m_\alpha^{ortho}$ is calculated by a linear combination of the desired boundary value $m_\alpha$ with desired boundary values $m_\beta$ from attributes $\beta$ that have a larger range than the attribute $\alpha$. $m_\alpha$ and $m_\beta$ are then desired boundary values of the original training object.

15 Claims, 5 Drawing Sheets

OTHER PUBLICATIONS

Figure 1A:
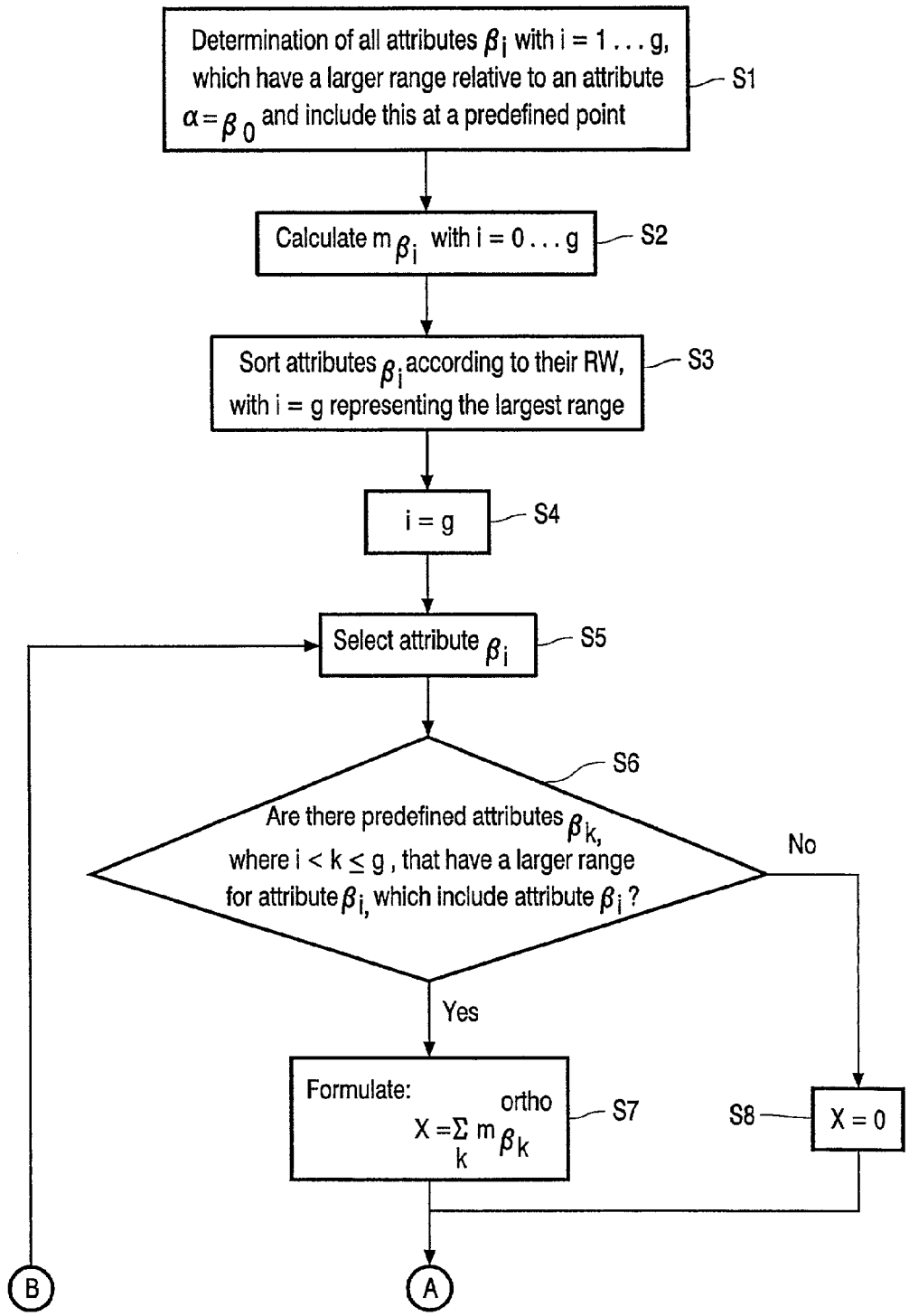

Peters, Jochen. Dietrich, Klakow. "Compact Maximum Entropy Language Models", Proceedings of the IEEE Workshop on Automatic Speech Recognition and Understanding, Dec. 1999.□□.*

Kneser, Reinhard. Peters, Jochen. "Semantic Clustering for Adaptive Language Modeling", Acoustics, Speech and Signal Processing, vol. 2, pp. 779-782, 1997.□□.*

Berger, Adam L. Della Pietra, Vincent J. Della Pietra, Stephan A. "A Maximum Entropy Approach to Natural Language Processing" Computational Linguistics vol. 22, Mar. 1996.□□.*

Mikheev, Andrei. "Feature Lattices for Maximum Entropy Modelling" International Conference on Computational Linguistics vol. 2, pp. 848-854 1998.□□.*

Greiff, Warren R. Ponte, Jay M. "The Maximum Entropy Approach and Probabilistic IR Models" ACM Transactions on Information Systems, vol. 18, pp. 246-287, Jul. 2000.*

By J.N. Darroch & D. Ratcliff, Entitled: "Generalized Iterative Scaling for Log Linear Models" Annals Math. Stat., 43(5): 1972, 1470-1480.

By R. Rosenfeld Entitled: "A Maximum-Entropy Approach to Adaptive Statistical Language Modeling"; Computer Speech and Language, 10: pp. 187-228, 1996.

R.Rosenfeld, "A Maximum Entropy Approach to Adaptive Statistical Language Modelling;" Computer Speech and Language, 1996, Academic Press Limited; 4 pgs.

J.N.Darroch et al., "Generalized Iterative Scaling For Log-Linear Models;" The Annals of Mathematical Statistics, vol. 43, No. 5; 1972; 10 pgs.

By J.N. Darroch & D. Ratcliff, Entitled: "Generalized Iterative Scaling for Log Linear Models" Annals Math. Stat., 43(5): 1972, 1470-1480, no month or day.

By R. Rosenfeld Entitled: "A Maximum-Entropy Approach to Adaptive Statistical Language Modeling"; Computer Speech and Language, 10: pp. 187-228, 1996, no month or day.

R.Rosenfeld, "A Maximum Entropy Approach to Adaptive Statistical Language Modelling;" Computer Speech and Language, 1996, Academic Press Limited; 4 pgs, no month or day.

J.N.Darroch et al., "Generalized Iterative Scaling For Log-Linear Models;" The Annals of Mathematical Statistics, vol. 43, No. 5; 1972; 10 pgs, no month or day.

* cited by examiner

SPEECH RECOGNITION SYSTEM, TRAINING ARRANGEMENT AND METHOD OF CALCULATING ITERATION VALUES FOR FREE PARAMETERS OF A MAXIMUM-ENTROPY SPEECH MODEL

The invention relates to a method of calculating iteration values for free parameters $\lambda_\alpha^{ortho(n)}$ of a maximum-entropy speech model MESM in a speech recognition system with the aid of the generalized iterative scaling training algorithm in accordance with the following formula:

$$\lambda_\alpha^{ortho(n+1)} = G(\lambda_\alpha^{ortho(n)}, m_\alpha^{ortho}, \ldots) \quad (1)$$

where:
n: is an iteration parameter;
G: is a mathematical function;
α: is an attribute in the MESM; and
$m_\alpha^{ortho}$: is a desired orthogonalized boundary value in the MESM for the attribute α.

The invention further relates to a computer-supported speech recognition system known in the state of the art, as well as a known computer-supported training arrangement in which the method described is implemented.

A starting point for the formation of a speech model as it is related in a computer-supported speech recognition system for recognizing entered speech is a predefined training object. The training object maps certain statistical patterns in the language of a future user of the speech recognition system into a system of mathematically formulated boundary conditions, which system generally has the following form:

$$\sum_{(h,w)} N(h) \cdot p(w|h) \cdot f_\alpha(h,w) = m_\alpha \quad (2)$$

where:
N(h): refers to the frequency of history h in a training corpus;
$p_{(w|h)}$: refers to probability p(w|h) with which a predefined word w follows a previous word sequence h (history);
$f_{\alpha(h,w)}$: refers to a binary attribute function for an attribute α; and α
$m_\alpha$: refers to a desired boundary value in the system of boundary conditions.

The solution of this system of boundary conditions i.e. the training object is formed by the so-termed maximum-entropy speech model MESM which indicates a suitable solution of the system of boundary conditions in the form of a suitable definition of the probability p(w|h), which reads as follows:

$$p(w|h) = p\lambda(w|h) = \frac{1}{Z_\lambda(h)} \cdot \exp\left(\sum_\alpha \lambda_\alpha \cdot f_\alpha(h,w)\right) \quad (3)$$

where:
Zλ(h): refers to a history-dependent standardization factor;
λα: refers to a free parameter for the attribute α;
λ: refers to the set of all parameters. For the above parameters hold their above definitions.

The binary attribute function fα(h,w) makes, for example, a binary decision whether predefined word sequences h,w contain predefined words at certain locations. An attribute α may generally refer to a single word, a word sequence, a word class (color or verbs), a sequence of word classes or more complex patterns.

Figure 4:
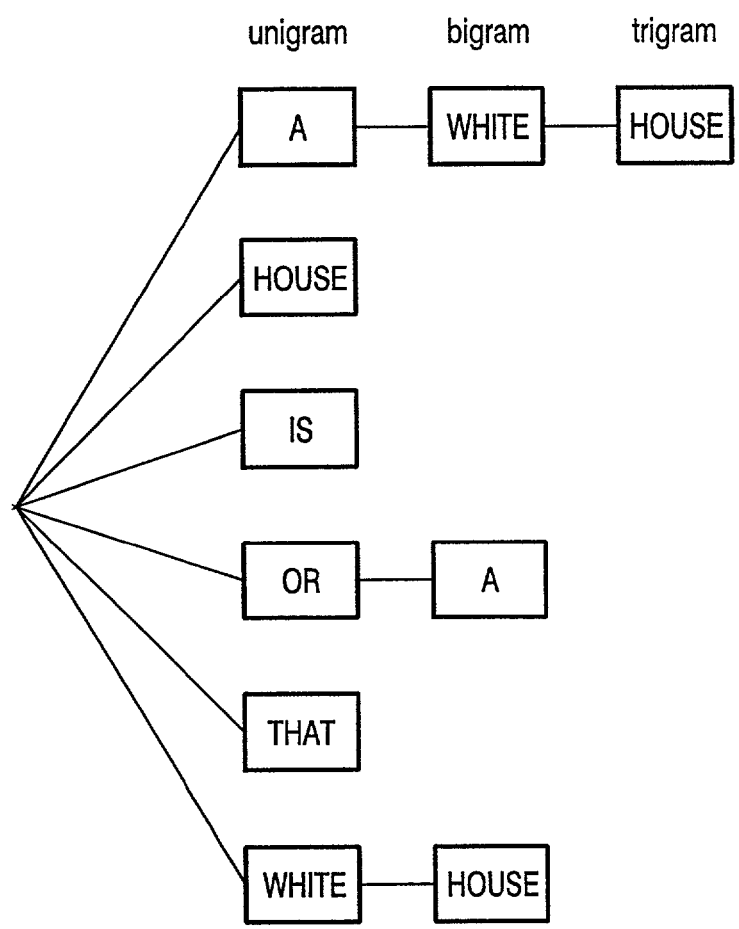

FIG. 4 shows predefined attributes in a speech model by way of example. For example, the unigrams shown each represent a single word, the bigrams each represent a word sequence consisting of two words and the trigram shown represents a word sequence consisting of three words. The bigram "ORA" includes the unigram "A" and, in addition, includes a further word; therefore it is referred to as having a larger range compared to the unigram "A". Analogously, the trigram "A WHITE HOUSE" has a larger range than the unigram "HOUSE" or than the bigram "WHITE HOUSE".

The free parameters λ are adapted so that equation 3 represents a solution for the system of boundary conditions according to equation 2. This adaptation is normally made with the aid of known training algorithms. An example for such a training algorithm is the so-termed generalized iterative scaling GIS algorithm as it is described, for example, in J. N. Darroch and D. Ratcliff, "Generalized iterative scaling for log linear models", Annals Math. Stat., 43(5):1470–1480, 1972.

This GIS algorithm provides an iterative calculation of the free parameters λ. Traditionally, this calculation is made very slowly, however. For expediting this calculation, there is proposed in the state of the art to substitute orthogonalized attribute functions $f_\alpha^{ortho}(h,w)$ for the attribute functions $f_\alpha(h,w)$ in the system of boundary conditions in accordance with equation (2); see for this purpose R. Rosenfeld "A maximum-entropy approach to adaptive statistical language modeling"; Computer Speech and Language, 10:187–228, 1996. Because of the substitution of the attribute functions on the left in equation 2, however, also the boundary values $m_\alpha$ on the right are changed. This changes the original system of boundary conditions i.e. the original training object in the customary sets approaches for estimating the boundary values; for this purpose see Rosenfeld at other locations, page 205, first sentence of the last-but-one paragraph.

In this respect it can be established as a disadvantage of the state of the art that when the calculation of the GIS algorithm is accelerated, the free parameters λ are trained to a changed training object. The parameters λ calculated in this manner are the cause for an inadequate adaptation of the speech model to the original training object when the parameter λ is used in equation 3.

Starting from this state of the art it is an object of the invention to further develop a known computer-supported speech recognition system, a computer-supported training system and a known method of iteratively calculating free parameters $\lambda_\alpha^{ortho(n)}$ of a maximum-entropy speech model in the speech recognition system, so that they make a fast calculation possible of the free parameters λ without a change of the original training object.

This object is achieved in that with the known above-described method of calculating the free parameters λ according to the GIS algorithm, any desired orthogonalized boundary value $m_\alpha^{ortho}$ is calculated by linearly combining the associated desired boundary value $m_\alpha$ with desired boundary values $m_\beta$ of attributes β that have a larger range than the attribute α. Here $m_\alpha$ and $m_\beta$ are desired boundary values of the original training object.

The use of the boundary values $m_\alpha^{ortho}$ calculated in this manner makes it possible in an advantageous manner to make an improved approximation of the free parameters λ and thus an improvement of the speech model with a view to the original training object. This qualitative improvement is possible while a high convergence speed continues to realize for the free parameters λ during the iterative calculation with the aid of the GIS algorithm.

The use of the desired orthogonalized boundary values $m_\alpha^{ortho}$ calculated according to the invention is recommended for several variants of the GIS training algorithm.

The object of the invention is furthermore achieved by a speech recognition system based on the maximum-entropy speech model MESM and a training system for training the MESM.

By implementing the method according to the invention in the training system, compared to the state of the art the MESM in the speech recognition system is adapted more effectively to the individual language peculiarities of a certain user of the speech recognition system; the quote with which the speech recognition system then correctly recognizes the semantic content in the user's speech is improved considerably.

Otherwise the advantages of this speech recognition system and of the training system correspond to the advantages discussed above for the method.

The following Figures are added to the description of the invention, in which

Figure 1B:
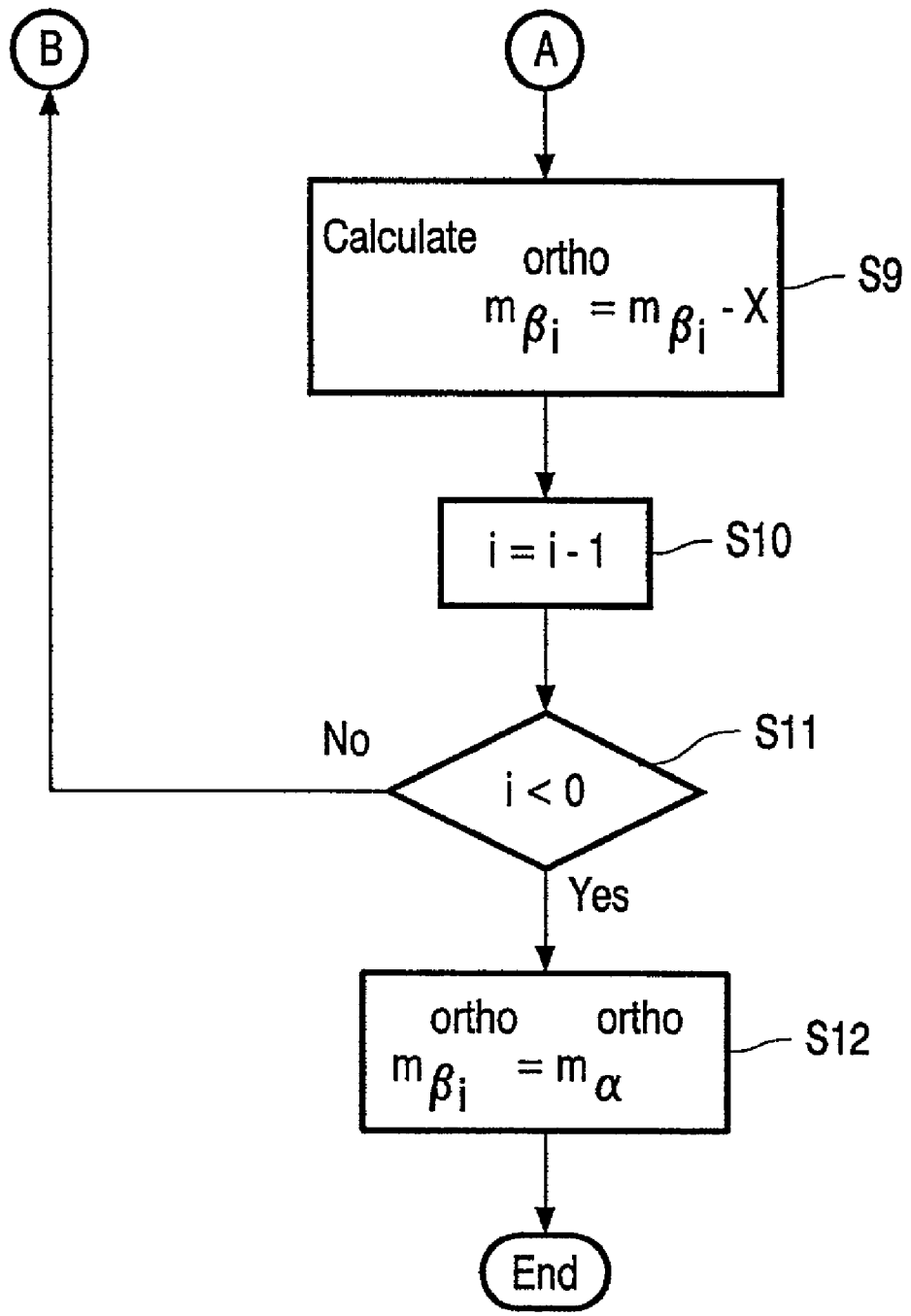
Figure 2A:
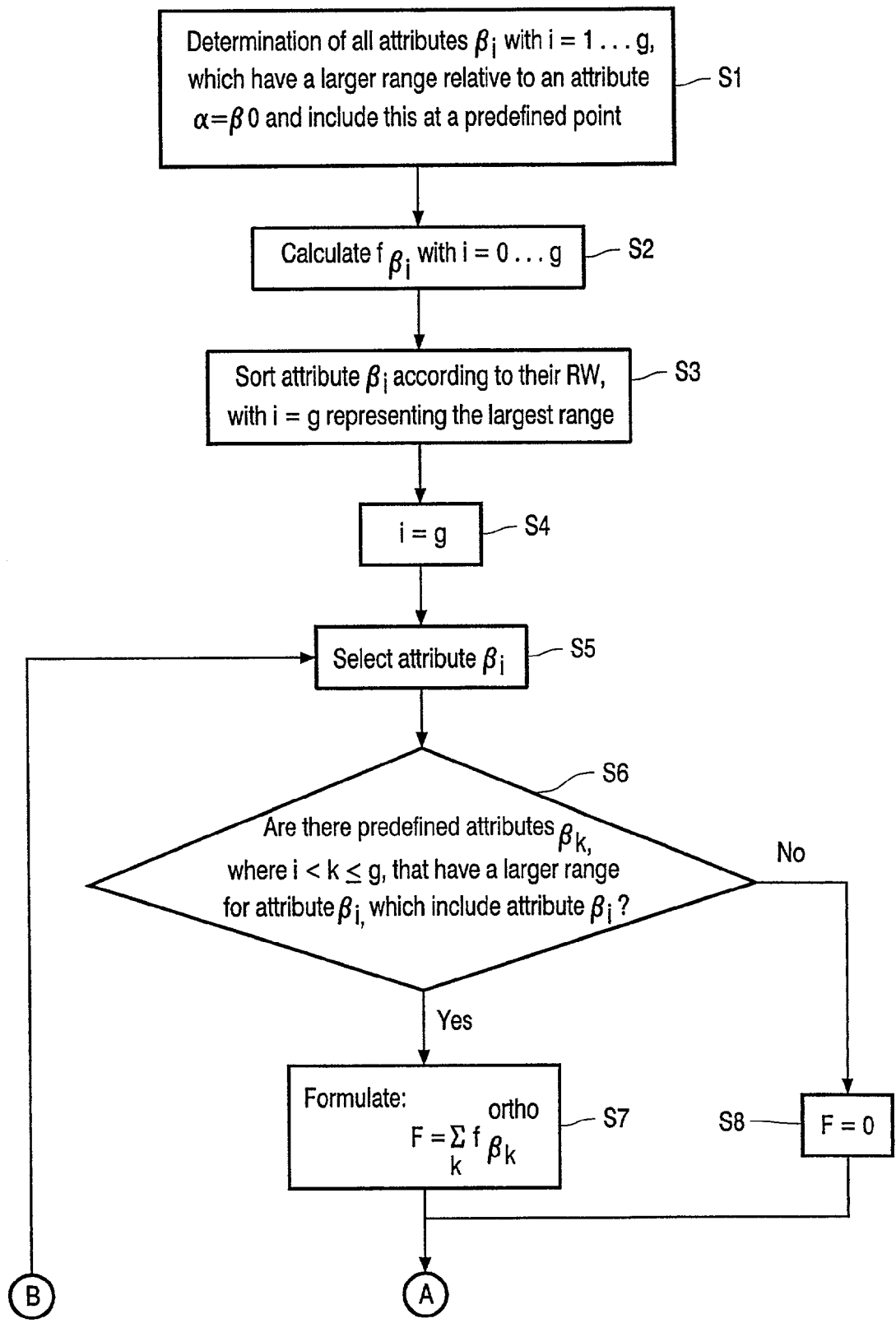
Figure 2B:
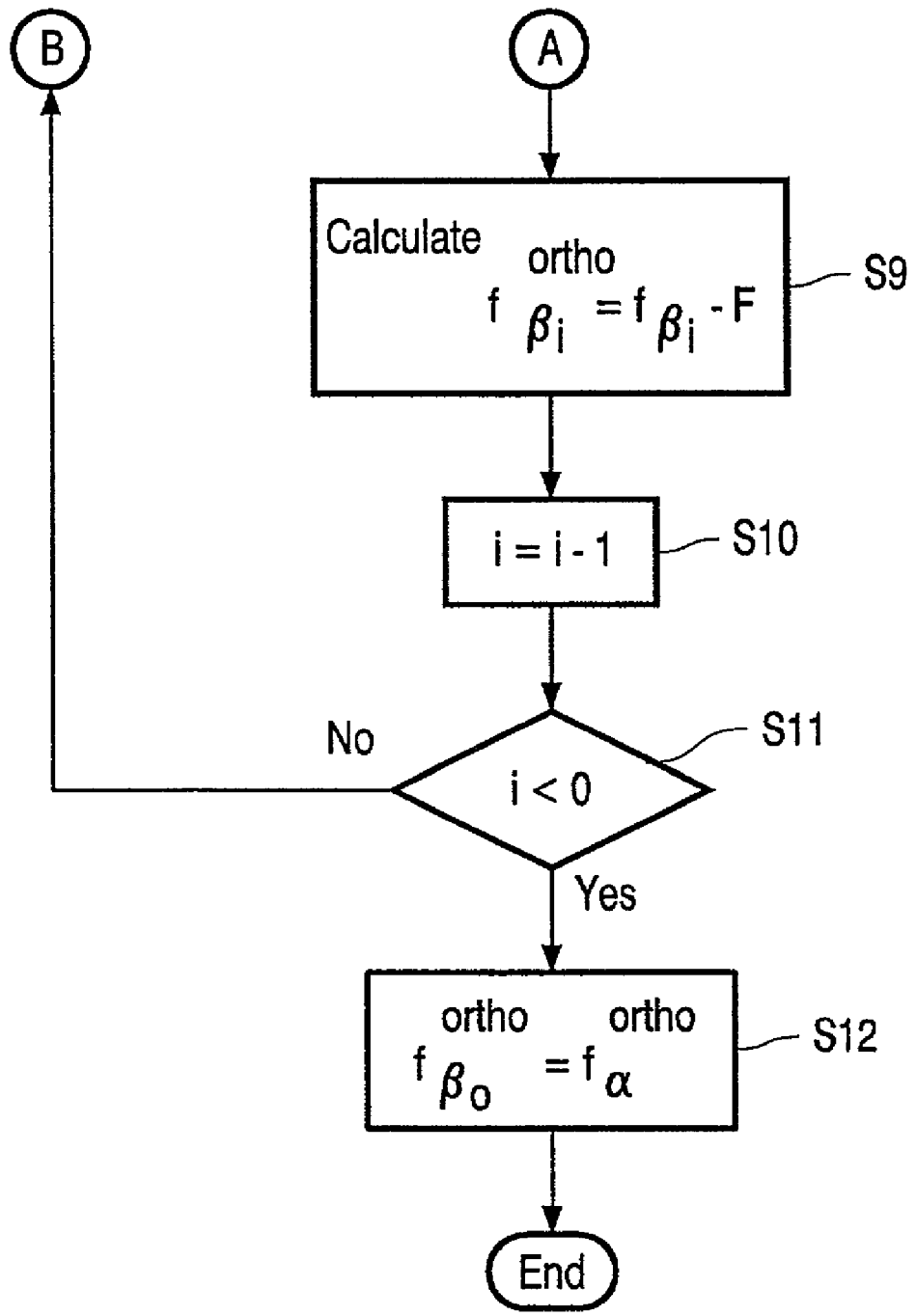
Figure 3:
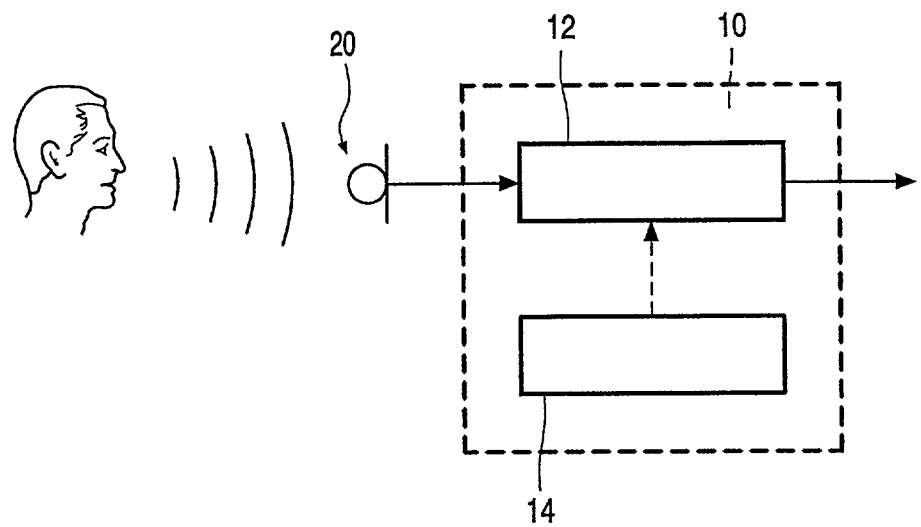

FIGS. 1a and 1b describe a method according to the invention of calculating a desired orthogonalized boundary value $m_\alpha^{ortho}$;

FIGS. 2a and 2b describe a method according to the invention of calculating an orthogonalized attribute function $f_\alpha^{ortho}$;

FIG. 3 describes a block diagram of a speech recognition system according to the invention;

FIG. 4 describes an attribute tree.

In the following first a detailed description is given of an example of embodiment of the invention while reference is made to FIGS. 1a and 1b.

FIGS. 1 and 1b illustrate a method according to the invention of calculating an improved desired orthogonalized boundary value $m_\alpha^{ortho}$ for an attribute $\alpha=\beta_0$ in a speech model. In a first step of the method all the attributes $\beta_i$ with i=1 . . . g that have a so-termed larger range than the predefined attribute $\alpha=\beta_0$ i.e. which include this at a predefined position are determined in accordance with this method. Subsequently, in a method step S2 a desired boundary value $m\beta_i$ of the original training object is calculated for all the attributes $\beta_i$ with i=0 . . . g, thus also for the attribute $\alpha=\beta_0$.

For the calculation of such a desired boundary value $m\beta_i$, several methods are known in the state of the art.

According to a first method the calculation is made in that first a frequency $N(\beta_i)$ is determined with which the associated binary attribute function $f\beta_i$ yields the value 1 when a training corpus of the speech model is used and that, subsequently, the thus determined frequency value $N(\beta_i)$ is smoothed.

According to a second, alternative method, the calculation is performed by reducing the quantities of attributes in the speech model until the boundary conditions no longer demonstrate conflicts. This sort of reduction in the quantity of attributes must be very extensive in practical situations, since otherwise the generated speech model will no longer represent a solution to the original training object. According to a third method, the calculation is made by using a so-called induced speech model as it is described in J. Peters and D. Klakow, "Compact Maximum Entropy Language Models", Proc. ASRU, Keystone, Colo., 1999.

In a method step S3 all the attributes $\beta_{ii}$ are subsequently sorted according to their range where an attribute $\beta_i$ that has the largest range is assigned the index i=g. It may then certainly happen that individual classes of ranges thus, for example, the class of bigrams or the class of trigrams are assigned a plurality of attributes $\beta_i$. In these cases a plurality of attributes $\beta_i$ having different, but successive indices i are assigned to one and the same class of ranges i.e. these attributes then always have the same RW and belong to the same class of ranges.

For the method to be carried out, in which in the successive steps the individual attributes $\beta_i$ are evaluated one after the other, it is important for the attributes to be processed according to decreasing (or constant) range. In the first run of the method a start is therefore made with an attribute βi which is assigned to the highest class of ranges; preferably i is set equal to g (see method step S4 and S5 in FIG. 1a).

In a subsequent method step S6 a check is then made whether larger-range attributes $\beta_k$ occur with i<k≦g for the currently selected attribute $\beta_i$, which include the attribute $\beta_i$. With the first run the attribute $\beta_i$ with i=g automatically belongs to the class that has the largest range, as observed above, and therefore the query in the method step S6 is to be answered in the negative for this attribute $\beta_i$. In this case the method jumps to method step S8 where a parameter X is set to zero. Then a calculation is made of an improved desired orthogonalized boundary value $m_{\beta i}^{ortho}$ for the attribute $\beta_i$ (with a first run with i=g) in accordance with method step S9. As can be seen there, this boundary value for the attribute $\beta_i$ is set equal to the desired boundary value $m\beta_i$ calculated in step S2, if the parameter X=0 (this is the case, for example, during the first run).

The method steps S5 to S11 are then successively repeated for all the attributes $\beta_i$−1 with i−1=g−1 . . . 0. In the method step S10 the index i is re-initialized, which is necessary, and in method step S11 a query is made whether all the attributes $\beta_i$ with i=0 . . . g have been processed.

For all attributes $\beta_i$ for which there are attributes $\beta_k$ with i<k≦g that have a larger range, the query in method step S6 must be answered with "Yes". The parameter X is then not set to zero but is instead calculated according to method step S7 by totaling the corresponding improved desired orthogonalized boundary values $m_{\beta k}^{ortho}$ each calculated in previous run-throughs in method step S9 for the respective attributes $\beta_k$ that have a larger range.

Once it has been determined in method step S11 that the desired orthogonalized boundary value $m_{\beta 0}^{ortho}$ has been calculated in method step S9, this is then output in method step S12 as $m_\alpha^{ortho}$. The method according to the invention extensively described just now for the calculation of the improved desired orthogonalized boundary value $m_\alpha^{ortho}$ may be shortened to the following formula:

$$m_\alpha^{ortho} = m\alpha - \sum_{(*)} m_\beta^{ortho}. \qquad (4)$$

The sum (*) includes all attributes β that have a larger range and contain the predefined attribute α. For calculating the boundary value $m_\beta^{ortho}$ said formula can be used in an almost recursive manner for each attribute β again and again until the sum term disappears for certain attributes, that is, for those with the largest range, because there are no more attributes that have a larger range for them. The desired orthogonalized boundary values for the attributes βk that have the largest range then correspond to the respective originally desired boundary values mβk.

The implementation of the method according to the invention and as shown in FIGS. 1a and 1b will be further explained hereinafter while use is made of the following training corpus of a speech model used by way of example. The training corpus reads:

| "THAT | WAS | A   | RED             |
|-------|-----|-----|-----------------|
|       | OR  | A   | GREEN HOUSE     |
|       | OR  | A   | BLUE HOUSE      |
| THIS  | IS  | A   | WHITE HOUSE AND |
| THAT  | IS  | THE | WHITE HOUSE"    |

The training corpus consists of N=23 individual words. It is assumed that in the speech model the desired unigram, bigram and trigram attributes are predefined according to FIG. 4.

Then, by using the normal attribute function fα for the training corpus it may be established that the unigrams, bigrams and trigrams according to FIG. 4 occur in the training corpus with the following frequencies:

| Unigrams: |       |       |   |
|-----------|-------|-------|---|
| A         | 4     |       |   |
| HOUSE     | 4     |       |   |
| IS        | 2     |       |   |
| OR        | 2     |       |   |
| THAT      | 2     |       |   |
| WHITE     | 2     |       |   |
| Bigrams:  |       |       |   |
| A         | WHITE | 1     |   |
| OR        | A     | 2     |   |
| WHITE     | HOUSE | 2     |   |
| Trigrams: |       |       |   |
| A         | WHITE | HOUSE | 1 |

In the example shown here the improved desired orthogonalized boundary value $m_\alpha^{ortho}$ is to be calculated for the attribute α="HOUSE". For this purpose first according to method step S1 in FIG. 1a all attributes that have a larger range are to be determined for the attribute α. They are according to FIG. 4 the bigram "WHITE HOUSE" and the trigram "A WHITE HOUSE". According to method step S2 the normal desired boundary values are to be calculated for these attributes that have a larger range but also for the attribute α, for example, in that the respective frequencies established above are smoothed. This smoothing is effected here, for example, by subtracting the value 0.1. Thus the following normal desired boundary values are the result:

$m_\alpha$: "HOUSE"=4-0.1=3.9

$m_{\beta_1}$: "WHITE HOUSE"=2-0.1=1.9

$m_{\beta_2}$: "A WHITE HOUSE"=1-0.1=0.9.

The attributes α, $\beta_1$, $\beta_2$ are now sorted according to their range and—starting with the widest ranging attribute—the respective improved desired orthogonalized boundary values are calculated according to formula (6) or according to method step S7–S9 in FIGS. 1a and 1b:

$$m_{\beta_2}^{ortho} = m_{\beta_2} = 0.9 \tag{5}$$

$$m_{\beta_1}^{ortho} = m_{\beta_1} - m_{\beta_2}^{ortho} = 1.9 - 0.9 = 1 \tag{6}$$

Finally, the improved desired orthogonalized boundary value $m_\alpha^{ortho}$ is calculated for the attribute α to:

$$m_\alpha^{ortho} = m_\alpha - m_{\beta_1}^{ortho} - m_{\beta_2}^{ortho} = 3.9 - 1 - 0.9 = 2 \tag{7}$$

The orthogonalized boundary value $m_\alpha^{ortho}$ calculated according to the invention makes a sufficiently accurate calculation possible of the free parameters λ and thus of the probability according to formula (1) with a view to an original training object while the calculation velocity remains the same when used in the GIS training algorithm.

Hereinafter the use of the boundary value $m_\alpha^{ortho}$ calculated according to the invention will be represented for three different variants of the GIS training algorithm.

With a first variant of the GIS training algorithm the mathematical function G has the following form according to equation 1 when the orthogonalized boundary value $m^{ortho}$ calculated according to the invention is used:

$$\lambda_\alpha^{ortho(n+1)} = G(\lambda_\alpha^{ortho(n)}, m_\alpha^{ortho}, , \ldots) \tag{8}$$

$$= \lambda_\alpha^{ortho(n)} + t_\alpha^{ortho} \cdot$$

$$\log \left( \frac{[t_\alpha^{ortho} \cdot m_\alpha^{ortho} + b_\alpha]}{[t_\alpha^{ortho} \cdot m_\alpha^{ortho(n)} + b_\alpha]} \cdot \frac{1 - \sum_\gamma [t_\gamma^{ortho} \cdot m_\gamma^{ortho(n)} + b_\gamma]}{1 - \sum_\gamma [t_\gamma^{ortho} \cdot m_\gamma^{ortho} + b_\gamma]} \right)$$

where:

n: refers to an iteration parameter;

α: refers to a just considered attribute;

γ: refers to all the attributes in the speech model;

$t_\alpha^{ortho}$, $t_\gamma^{ortho}$: refer to the size of the convergence step;

$m_\alpha^{ortho}$, $m_\gamma^{ortho}$: desired orthogonalized boundary values in the MESM for the attributes α and γ;

$m_\alpha^{ortho(n)}$, $m_\gamma^{ortho(n)}$: refers to iterative approximate values for the desired boundary values $m_\alpha^{ortho}$, $m_\gamma^{ortho}$; and bα and bγ: refer to constants.

The calculation of the convergence step sizes t and of the iterative approximate values for the desired boundary values m is effected—as will be shown hereinafter—by the use of an orthogonalized attribute function $f_\alpha^{ortho}$ defined according to the invention, which reads as follows:

$$f_\alpha^{ortho} = f\alpha - \sum_{(+)} f_\beta^{ortho} \tag{9}$$

It should be observed at this point that the orthogonalized attribute function $f_\alpha^{ortho}$ calculated according to the invention in accordance with equation 9 corresponds as regards value to the attribute function proposed by Rosenfeld at other locations. However, their calculation according to the invention is effected totally different as can be seen in FIGS. 2a and 2b. The calculation method is effected analogously to the method described in FIGS. 1a and 1b for the calculation of the desired orthogonalized boundary values $m_\alpha^{ortho}$ where only the symbol for the boundary value m is to be replaced by the symbol for the attribute function f and the parameter X by the function F. To avoid repetitions, reference is made here to the description of FIGS. 1a and 1b for explanations of the method according to FIGS. 2a and 2b.

With the orthogonalized attribute function $f_\alpha^{ortho}$ or $f_\beta^{ortho}$ thus calculated according to the invention, the size of the convergence steps $t_\alpha^{ortho}$ and $t_\gamma^{ortho}$ is calculated in equation 8 as follows:

$$f_\alpha^{ortho} = t_\gamma^{ortho} = 1/M^{ortho} \text{ with } M^{ortho} = \max_{(h,w)}\left(\sum_\beta f_\beta^{ortho}(h,w)\right) \quad (10)$$

where Mortho for binary attribute functions $f_\beta^{ortho}$ represents the maximum number of functions which yield the value 1 for the same argument (h,w).

Furthermore, with the attribute function $f_\alpha^{ortho}$ defined according to the invention, the iterative approximate value $m_\alpha^{ortho(n)}$ can be calculated for the desired orthogonalized boundary value $m_\alpha^{ortho}$ when the following equation (2) is used:

$$m_\alpha^{ortho(n)} = \sum_{(h,w)} N(h) \cdot p^{(n)}(w|h) \cdot f_\alpha^{ortho}(h,w); \quad (11)$$

where:

N(h): refers to the frequency of the history h in the training corpus; and $p^{(n)}(w|h)$: refers to an iteration value for the probability p(w|h) with which a predefined word w follows a previous word sequence h (history);

Here $p^{(n)}(w|h)$ uses the parameter values $\lambda_\alpha^{ortho(n)}$.

The use of the improved desired orthogonalized boundary value $m_\alpha^{ortho}$ calculated according to the invention is furthermore recommended for a second variant of the GIS training algorithm. Here the attributes of the MESM are subdivided into m groups Ai and for each iteration only the parameters $\lambda_\alpha^{ortho}$ of the attributes α from one of the groups are changed according to the following formula:

$$\lambda_\alpha^{ortho(n+1)} = G(\lambda_\alpha^{ortho(n)}, m_\alpha^{ortho}, \ldots) \quad (12)$$

$$= \lambda_\alpha^{ortho(n)} + t_\alpha^{ortho} \cdot \log\left(\frac{m_\alpha^{ortho}}{m_\alpha^{ortho(n)}} \cdot \frac{1 - \sum_{\beta \in Ai(n)}(t_\beta \cdot m_\beta^{ortho(n)})}{1 - \sum_{\beta \in Ai(n)}(t_\beta \cdot m_\beta^{ortho})}\right)$$

where:

n: represents the iteration parameter $A_{i(n)}$: represents an attribute group $A_{i(n)}$ with $1 \leq i \leq m$ selected in the $n^{th}$ iteration step;

α: represents a just considered attribute from the just selected attribute group Ai(n);

β: represents all attributes from the attribute group Ai(n);

$t_\alpha^{ortho}$, $t_\beta^{ortho}$: represent the size of the convergence step with $t_\alpha^{ortho} = t_\beta^{ortho} = 1/M_{i(n)}^{ortho}$ with $$M_{i(n)}^{ortho} = \max_{(h,w)}\left(\sum_{\beta \in Ai(n)} f_\beta^{ortho}(h,w)\right)$$

where $M_{i(n)}^{ortho}$ for binary functions $f_\beta^{ortho}$ represents the maximum number of functions from the attribute group Ai(n) which yield the value 1 for the same argument (h,w);

$m_\alpha^{ortho}$, $m_\beta^{ortho}$: represent the desired orthogonalized boundary values in the MESM for the attributes α and β respectively;

$m_\alpha^{ortho(n)}$, $m_\beta^{ortho(n)}$: represents iterative approximate values for the desired boundary values $m_\alpha^{ortho}$, $m_\beta^{ortho}$.

The group Ai(n) of attributes α whose parameters $\lambda_\alpha^{ortho}$ are adapted in the current iteration step, then cyclically runs through all the m groups in accordance with i(n)=n(mod m).

The use of the desired orthogonalized boundary value $m_\alpha^{ortho}$ calculated according to the invention is further recommended for a third variant of the GIS training algorithm which distinguishes itself from the second variant only in that the attribute group Ai(n) to be used for each iteration step is not selected cyclically but according to a predefined criterion $D_i^{(n)}$.

FIG. 3 finally shows a speech recognition system 10 of the type according to this invention which is based on the so-termed maximum-entropy speech model. It includes a recognition device 12 which attempts to recognize the semantic content of supplied speech signals. The speech signals are generally supplied to the speech recognition system in the form of output signals from a microphone 20. The recognition device 12 recognizes the semantic content of the speech signals by mapping patterns in the received acoustic signal on two predefined recognition symbols such as specific words, actions or events, using the implemented maximum-entropy speech model MESM. Finally, the recognition device 12 outputs a signal which represents the semantic content recognized in the speech signal and can be used to control all kinds of equipment—for example a word-processing program or telephone.

To make the control of the equipment as error-free as possible in terms of the semantic content of speech information used as a control medium, the speech recognition system 10 must recognize the semantic content of the speech to be evaluated as correctly as possible. To do this, the speech model must be adapted as effectively as possible to the linguistic peculiarities of the speaker, i.e. the user of the speech recognition system. This adaptation is performed by a training system 14 which can be operated either externally or integrated into the speech recognition system 10. To be more accurate, the training system 14 is used to adapt the MESM in the speech recognition system 10 to recurrent statistical patterns in the speech of a particular user.

Both the recognition device 12 and the training system 14 are normally, although not necessarily, in the form of software modules and run on a suitable computer (not shown).

The invention claimed is:

1. A method of calculating iteration values for free parameters $\lambda_\alpha^{ortho(n)}$ of a maximum-entropy speech model MESM in a speech recognition system with the aid of the generalized iterative scaling training algorithm, the method comprising the step of
    iteratively determining:

$$\lambda_\alpha^{ortho(n+1)} = G(\lambda_\alpha^{ortho(n)}, m_\alpha^{ortho}, \ldots)$$

where:
    n: is an iteration parameter;
    G: is a mathematical function;
    α: is an attribute in the MESM; and
    $m_\alpha^{ortho}$: is a desired orthogonalized boundary value in the MESM for the attribute α,
    characterized in that the desired orthogonalized boundary value $m_\alpha^{ortho}$ is calculated by linearly combining the desired boundary value $m_\alpha$ with desired boundary values $m_\beta$ of attributes β that have a larger range than the attribute α.

2. A method as claimed in claim 1, characterized in that the calculation of the desired orthogonalized boundary value $m_\alpha^{ortho}$ for the attribute $α=β_0$ comprises the following steps:

a) Selecting all the attributes $\beta_i$ with i=1 ... g in the speech model that have a larger range RW than the attribute $\alpha=\beta_0$ and include the latter;
b) Calculating desired boundary values $m\beta i$ for the attributes $\beta_i$ with i=0 ... g;
c) Sorting the attributes $\beta_i$ with i=0 ... g according to their RW;
d) Selecting one of the attributes $\beta_i$ having the largest RW;
e) Checking whether there are other attributes $\beta_k$ which include the attribute $\beta_i$ and have a larger RW than the selected attribute $\beta_i$;
f1) If so, defining a parameter X as a linear combination of the orthogonalized boundary values $m_{\beta k}^{ortho}$ calculated in step g) during the last run of the steps e) to g) for all the attributes $\beta_i$ that have a larger range and are determined in the most recently run step e);
f2) If not, defining the parameters X to X=0;
g) Calculating the desired orthogonalized boundary value $m_{\beta k}^{ortho}$ for the attribute $\beta_i$ by arithmetically combining the desired boundary value $m\beta_i$ with a parameter X; and
h) Repeating the steps e) to g) for the attribute $\beta_i-1$ whose RW is smaller than or equal to the RW of the attribute $\beta_i$ until the desired orthogonalized boundary value $m^{\beta 0 ortho}=m_\alpha^{ortho}$ with i=0 has been calculated in step g).

3. A method as claimed in claim 2, characterized in that the calculation of the parameter X in step f1) is made according to the following formula:

$$X = \sum_k m_{\beta k}^{ortho}.$$

4. A method as claimed in claim 3, characterized in that the calculation of the desired orthogonalized boundary value $m_{\beta i}^{ortho}$ is made in step g) according to the following formula:

$$m_{\beta i}^{ortho}=m_{\beta i}-X.$$

5. A method as claimed in claim 2, characterized in that the calculation of the desired boundary values $m_{\beta i}$ for the attributes $\beta_i$ with i=0, ... , g is made in step b) by respectively calculating the frequency $N(\beta_i)$, with which the attribute $\beta_i$ occurs in a training corpus and by subsequently smoothing the calculated frequency value $N(\beta_i)$.

6. A method as claimed in claim 5, characterized in that the calculation of the frequency $N(\beta_i)$ is made by applying a binary attribute function $f\beta_i$ to the training corpus where $f\beta_i$ is defined as:

$$f_{\beta i}(h,w)f_{\beta i}(h,w) = \begin{cases} 1 \text{ if } \beta_i \text{ fits in the word sequence } (h,w) \\ \text{otherwise } 0 \end{cases}$$

and where $f_{\beta i}(h,w)$ indicates whether the attribute $\beta_i$ correctly describes a pattern predefined by the word sequence (h,w).

7. A method as claimed in claim 1, characterized in that the mathematical function G has as a further variable the magnitude of a convergence step $t_\alpha^{ortho}$ with:

$$t_\alpha^{ortho}=1/M^{ortho}$$

where
$M^{ortho}$: represents for binary functions $f_\alpha^{ortho}$ the maximum number of functions which yield the value 1 for the same argument (h,w).

8. A method as claimed in claim 7, characterized in that the attribute function $f_\alpha^{ortho}$ is calculated by linearly combining an attribute function $f_\alpha$ with orthogonalized attribute functions $f_\beta^{ortho}$ is calculated from attributes $\beta$ that have a larger range than the attribute $\alpha$.

9. A method as claimed in claim 8, characterized in that the calculation of the orthogonalized attribute function $f^{\alpha ortho}$ for the attribute $\alpha=\beta_0$ comprises the following steps:
a) Selecting all the attributes $\beta_i$ with i=1 ... g in the speech model that have a larger range RW than the attribute $\alpha=\beta_0$ and include the latter;
b) Calculating boundary values $f\beta_i$ for the attributes $\beta_i$ with i=0 ... g;
c) Sorting the attributes $\beta_i$ with i=0 ... g according to their RW;
d) Selecting one of the attributes $\beta_i$ having the largest RW;
e) Checking whether there are other attributes $\beta k$ which include the attribute $\beta_i$ and have a larger RW than the selected attribute $\beta_i$;
f1) If so, defining a function F as a linear combination of the orthogonalized attribute function $f_{\beta k}^{ortho}$ calculated in step g) during the last run of the steps e) to g) for all the attributes $\beta_k$ that have a larger range determined in the most recently run step e);
f2) If not, defining the function F to F=0;
g) Calculating the orthogonalized attribute function $f^{\beta i ortho}$ for the attribute $\beta i$ by arithmetically combining the attribute function $f\beta_i$ with the function F; and
h) Repeating the steps e) to g) for the attribute $\beta_i-1$ whose range is smaller than or equal to the range of the attribute $\beta_i$ until the orthogonalized attribute function $f^{\beta 0 ortho}=f_\alpha^{ortho}$ with i=0 has been calculated in step g).

10. A method as claimed in claim 9, characterized in that the calculation of the function F in step f1) is made according to the following formula:

$$F = \sum_k f_{\beta k}^{ortho}.$$

11. A method as claimed in claim 9, characterized in that the calculation of the orthogonalized attribute function $f^{\beta i ortho}$ in step g) is made according to the following formula:

$$f_{\beta i}^{ortho}=f_{\beta i}-F.$$

12. A method as claimed in claim 1, characterized in that the mathematical function G has the following form:

$$\lambda_\alpha^{ortho(n+1)} = G(\lambda_\alpha^{ortho(n)}, m_\alpha^{ortho}, \ldots)$$

-continued $$= \lambda_\alpha^{ortho(n)} + t_\alpha^{ortho} \cdot \log\left(\frac{[t_\alpha^{ortho} \cdot m_\alpha^{ortho} + b_\alpha]}{[t_\alpha^{ortho} \cdot m_\alpha^{ortho(n)} + b_\alpha]} \cdot \frac{1 - \sum_\gamma [t_\gamma^{ortho} \cdot m_\gamma^{ortho(n)} + b_\gamma]}{1 - \sum_\gamma [t_\gamma^{ortho} \cdot m_\gamma^{ortho} + b_\gamma]}\right)$$

where:
- α: refers to a just considered attribute;
- γ: refers to all the attributes in the speech model;
- $t_\alpha^{ortho}$, $t_\gamma^{ortho}$: refer to the size of the convergence step with $t_\alpha^{ortho} = t_\gamma^{ortho} = 1/M^{ortho}$ with $$M^{ortho} = \max_{(h,w)}\left(\sum_\beta f_\beta^{ortho}(h, w)\right);$$

where $M^{ortho}$ for binary functions $f_\beta^{ortho}$ represents the maximum number of functions which yield the value 1 for the same argument (h,w);
- $m_\alpha^{ortho}$, $m_\gamma^{ortho}$: refers to desired orthogonalized boundary values in the MESM for the attributes α and γ;
- $m_\alpha^{ortho(n)}$, $m_\gamma^{ortho(n)}$: refers to iterative approximate values for the desired boundary values $m_\alpha^{ortho}$, $m_\gamma^{ortho(n)}$; and
- bα and bγ: refer to constants.

13. A method as claimed in claim 1, characterized in that the mathematical function has the following form:

$$\lambda_\alpha^{ortho(n+1)} = G(\lambda_\alpha^{ortho(n)}, m_\alpha^{ortho}, , ...)$$

$$= \lambda_\alpha^{ortho(n)} + t_\alpha^{ortho} \cdot \log\left(\frac{m_\alpha^{ortho}}{m_\alpha^{ortho(n)}} \cdot \frac{1 - \sum_{\beta \in Ai(n)} (t_\beta \cdot m_\beta^{ortho(n)})}{1 - \sum_{\beta \in Ai(n)} (t_\beta \cdot m_\beta^{ortho})}\right)$$

where:
- n: represents the iteration parameter;
- $A_{i(n)}$: represents an attribute group $A_{i(n)}$ with $1 \leq i \leq m$ selected in the $n^{th}$ iteration step;
- α: represents a just considered attribute from the just selected attribute group $A_{i(n)}$;
- β: represents all the attributes of the attribute group Ai(n);
- $t_\alpha^{ortho}$, $t_\beta^{ortho}$: represents the size of a convergence step with $t_\alpha^{ortho} = t_\beta^{ortho} = 1/M_{i(n)}^{ortho}$ with $$M_{i(n)}^{ortho} = \max_{(h,w)}\left(\sum_{\beta \in Ai(n)} f_\beta^{ortho}(h, w)\right)$$

where $M_{i(n)}^{ortho}$ represents for binary functions $f_\beta^{ortho}$ the maximum number of functions from the attribute group $A_{i(n)}$, which yield the value 1 for the same argument (h,w);
- $m_\alpha^{ortho}$, $m_\beta^{ortho}$: represent desired orthogonalized boundary values in the MESM for the attributes α and β respectively;
- $m_\alpha^{ortho(n)}$, $m_\beta^{ortho(n)}$: represent iterative approximate values for the desired boundary values $m_\alpha^{ortho}$, $m_\beta^{ortho}$;

where the selection of the group=$A_{i(n)}$ of attributes α, whose associated parameters $\lambda_\alpha^{ortho}$ are adapted to a current iteration step is made either cyclically or according to a predefined criterion.

14. A speech recognition system comprising: a recognition device for recognizing the semantic content of an acoustic signal captured and rendered available by a microphone, more particularly a speech signal, by mapping parts of this signal onto predefined recognition symbols as they are offered by the implemented maximum-entropy speech model MESM, and for generating output signals which represent the recognized semantic content; and a training system for adapting the MESM to recurrent statistical patterns in the speech of a certain user of the speech recognition system; characterized in that the training system calculates free parameters λ in the MESM in accordance with the method as claimed in claim 1.

15. A training system for adapting the maximum-entropy speech model MESM in a speech recognition system to recurrent statistical patterns in the speech of a certain user of this speech recognition system, characterized in that the training system calculates free parameters λ in the MESM in accordance with the method as claimed in claim 1.

* * * * *